April 14, 1942.  J. F. SELMER  2,279,597
CONTROLLING MEANS FOR HOISTS AND WINCHES
Filed Aug. 8, 1939  2 Sheets-Sheet 1

Inventor:
J. F. Selmer,
By
Atty.

April 14, 1942.   J. F. SELMER   2,279,597
CONTROLLING MEANS FOR HOISTS AND WINCHES
Filed Aug. 8, 1939   2 Sheets-Sheet 2
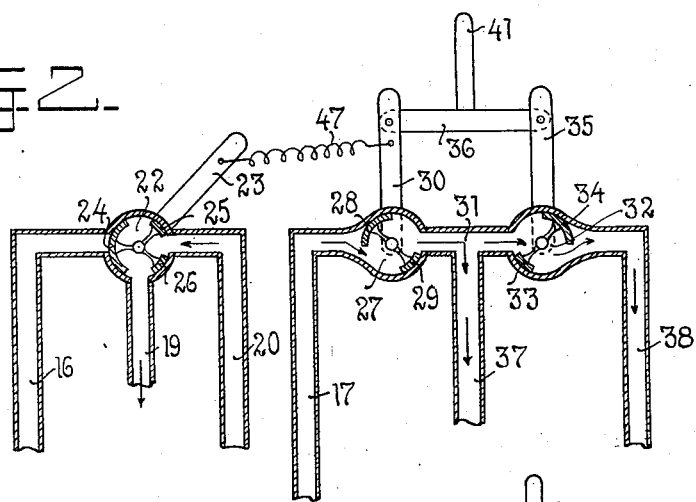
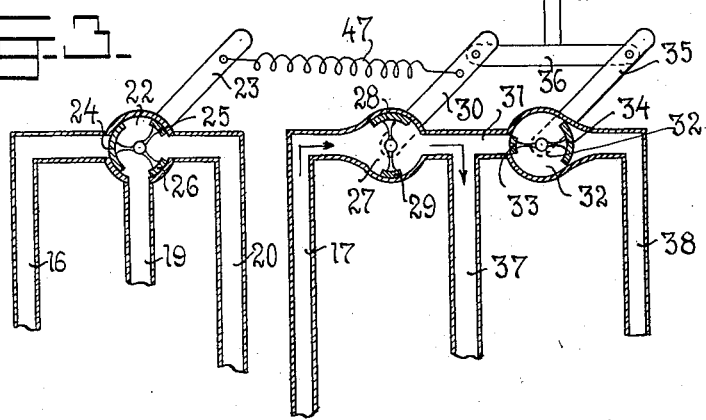
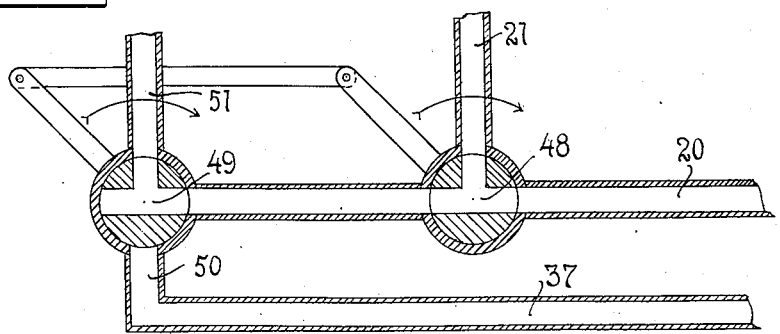
Inventor
J. F. Selmer
By C. F. Wenderoth
Atty Patented Apr. 14, 1942

2,279,597

UNITED STATES PATENT OFFICE 2,279,597

CONTROLLING MEANS FOR HOISTS AND WINCHES

Johan Fredrik Selmer, Oslo, Norway

Application August 8, 1939, Serial No. 289,035
In Norway July 14, 1939

5 Claims. (Cl. 192—12)

The present invention relates to that type of hoists and winches where the load is hoisted by winding a wire on to a drum, and where the load is lowered due to the force of gravity under the control of brakes which act directly or indirectly on the drum. This type of hoist and winch is used for many different purposes, and one of the objects of this invention is to provide means which will simplify the manipulation of the different means which are needed for the control of the winch in hoisting or lowering.

There has until now usually in this type of hoist and winch been arranged different levers or pedals for the control of the different apparatuses, as for instance clutches and brakes. According to this invention these means are simplified in combination with fluid operated mechanisms for controlling the brake and the clutch. The different valves which are used for controlling the fluid power to the operating means for the brake and clutch are arranged in such a way and connected together so that a minimum of manipulation is needed for establishing the different working conditions for the hoist.

In combination herewith one object of this invention is to provide a pressure regulating valve arrangement which may be assembled of standard valves by connecting into a pipe leading from the source of driving fluid to the atmosphere two oppositely acting valves, and from a point on the pipe between these two valves to connect a pipe which leads to the operating mechanism for the brake, whereby this brake operating mechanism at any time, when the two valves are manipulated, will be subjected to a driving fluid pressure which will be fixed by the position of the two valves in relation to each other.

A further object of this invention is to provide in a pipe from a source of driving fluid to the operating mechanism for the brake and for the clutch a three-way valve, the third opening of which is open to the atmosphere, these valves being constructed in such a way that in one position of the same the opening to the source of driving fluid will be closed and the connection to the operating mechanism for the brake and the clutch will be in connection with the atmosphere through the valve. The valve arrangement just described will thus by a simple manipulation of a handle serve to control the winch or the hoist during the hoisting operation, due to the fact that the first mentioned position, where the brake and the clutch operating mechanism is in connection with the driving fluid, will provide for a lifting of the brake from the brake drum and a closing of the clutch, whereby the hoisting drum is connected to the prime mover and the hoisting will take place.

In the second position of this valve, the controlling mechanism for the brake and the clutch will be opened to the atmosphere, whereby the brake is closed and the clutch is opened in such a way that the hoisting drum will stop and the load will be held in the hoisted position.

The previously described pressure regulating mechanism will in combination herewith serve for the lowering of the load, due to the fact that one in the stop position of the three-way valve may provide for a suitable fluid pressure to the operating mechanism for the brake in such a way that the load under the action of gravity will be lowered at a rate of speed as desired.

The controlling means according to this invention may be constructed in different ways to suit different purposes; thus for instance one may arrange two different fluid actuated operating mechanisms for the brake, one in connection with the three-way valve and one in connection with the said pressure regulating valve. If it is desired, however, it is quite possible to operate the brake with only one fluid actuated operating mechanism; but in such case it is necessary to introduce additional valves which at the time of lowering will open the pipe to the clutch to the atmosphere possibly through the said three-way valve and simultaneously close the connection between the brake mechanism and the three-way valve, providing a passage from the brake mechanism to the said pressure regulating valves.

As the invention in the foregoing has been described, it is consequently possible to operate the winch or the hoist of the type mentioned for hoisting, stopping and lowering at desired speed by means of two handles or pedals only. It is, however, quite possible and it is also an object of this invention to interconnect these handles by means of suitable mechanical mechanism in such a way that one with one handle only will provide for all the operating movements which are needed as well for hoisting as for stopping and for lowering.

With the above and other objects in view which will become apparent from the detailed description below the invention is shown in the drawings in which:

Fig. 2 is a view of the valves when located in intermediate lowering position.

Fig. 3 is a similar view showing the valves at full speed lowering position, and Fig. 4 shows a modified construction.

Figure 1:
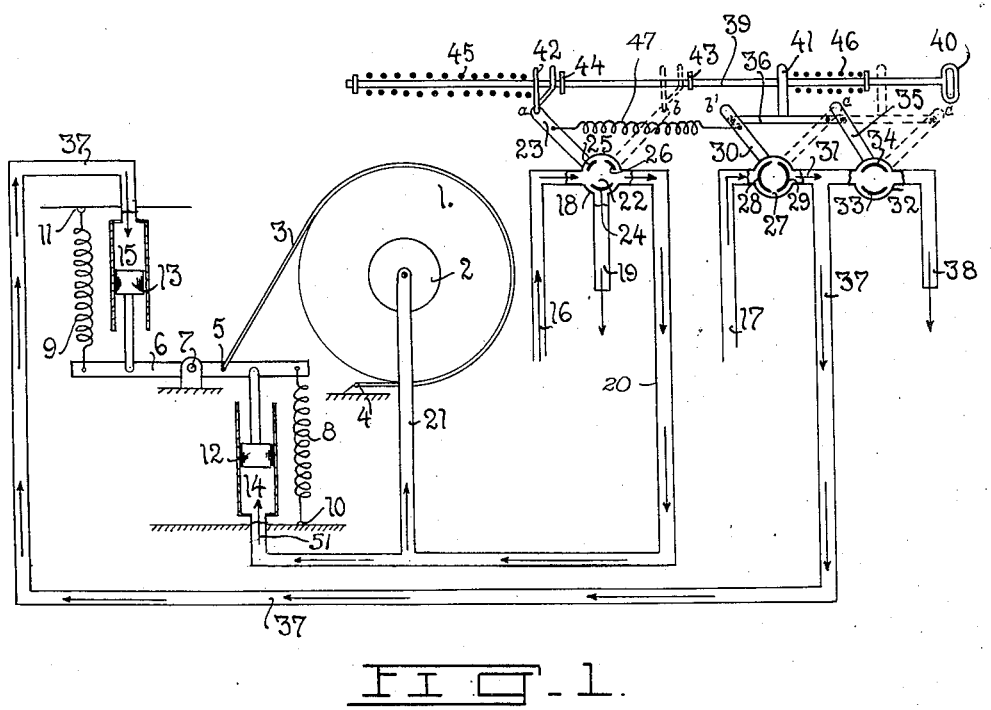
Fig. 1 shows one embodiment of the invention with the valves placed in hoisting position.

In the drawings, 1 denotes the hoisting drum and 2 the fluid operated clutch which serves to connect the hoisting drum 1 with a driving shaft on the prime mover, not shown in the drawing. 3 is a brake band which at 4 is anchored to the frame of the machine and at 5 to a lever 6 which is pivotally journalled to the frame at 7, and which at each end by means of springs 8 and 9 may be anchored to the frame at 10 and 11. The lever 6 is operated by means of the pistons 12 and 13 respectively, arranged in the cylinders 14 and 15 which are in connection with fluid driving power. The clutch 2 is also operated by means of fluid actuated means which are not shown in the drawings. A source of fluid energy, it may be gas or liquid, is in connection with the pipes 16 and 17. The pipe 16 leads through a three-way valve 18 which has an opening 19 to the atmosphere and a pipe-connection 20 to the cylinder 14, and from this pipe 20 a branch 21 leads to the fluid actuated mechanism for the clutch 2. The three-way valve 18 has a rotating slide 22 which is controlled by a lever 23. This slide 22 has closing sections 24, 25, 26 which by the swinging action of the lever 23 respectively will serve to establish connection between the pipe 16 and the pipe 20 or between the pipe 19 and the pipe 20. The driving fluid therefore acts through the valve from the pipe 16 to the pipe 20 and further from this to the cylinder 14 and the clutch 2, whereby the brake band 3 is lifted and the clutch 2 is closed.

If the driving machine for the hoist is running, the drum 1 will be set in rotation and the load will be lifted. If now the lever 23 is swung in the clock-wise direction from its position a to the position shown in dotted lines at b, then the section 24 of the slide 22 will close the entrance of the pipe 16 to the valve and a connection will be opened between the pipe 20 and the atmosphere through the pipe 19, whereby the brake band under the action of the springs 8 and 9 will be tightened and the clutch 2 will be lifted.

The pipe 17 from the driving fluid leads to a valve 27 which in the drawings has been illustrated as having a rotating slide which may be substituted for any other suitable type of valve. This valve has two closing members 28 and 29, which are operated by a lever 30. In the drawings, Figs. 1, 2 and 3, this valve is shown respectively in the closed, intermediate and open position. From the valve a pipe 31 leads to another valve 32 of the same type as the valve 27. This valve has also two closing members 33 and 34 which are controlled by a lever 35. The two valves above mentioned are set in opposite positions, i. e. when one is closed, the other is opened and vice versa. In intermediate positions they both may be more or less opened or closed as seen in Figs. 1, 2 and 3.

The two levers 30 and 35 are permanently connected together by means of the link 36 in such a way that both valves have to be operated simultaneously.

From the pipe 31 a branch pipe 37 leads to the cylinder 15 which is constructed to act on the brake mechanism. When the link 36 is moved in the clock-wise direction, the position of the two valves 27, 32 will be varied, and as the valve 27 is slowly opened (see Fig. 2) and the valve 32 is slowly closed, the pressure between these two will vary in relation to the position of the two valves at any time. The pressure will correspond to atmospheric pressure in the position shown in the drawings (Fig. 1) and will correspond to the pressure in the pipe 17 in the opposite directions where the levers in the drawings have been shown in dotted lines in Fig. 1 and in full lines in Fig. 3. Between these two positions any desired pressure between atmospheric pressure and the pressure in the pipe 17 may be obtained (see Fig. 2). This controllable pressure will through the pipe 37 pass on to the cylinder 15, and the brake band will be lifted in the degree corresponding to the pressure, whereby the valve mechanism 27, 32 may be used for lowering the load at the desired speed under the control of the brake band 3.

When using the operating mechanism as now described, one may assume that we take as a starting position the position shown in the drawings (Fig. 1). In this position the hoisting of the load takes place. When the load has been hoisted to the desired elevation, the handle 23 is moved from the position a to the position b (Fig. 1) and the load will stop. The hand is then moved over from the lever 23 to the lever 30 or to the link 36 and this is moved slowly in the clock-wise direction (Fig. 2), whereby the lowering of the load under control will take place due to the fact that the driving fluid is acting on the piston 15. Lowering of the load at full speed will take place when the handle 30 is moved over from the position b to the position c (Fig. 3). At this position the valve 27 will be fully opened while the valve 32 will be completely closed to the atmosphere through the pipe 38.

If one now desires to introduce means whereby these two operations which always have to take place in a given sequence shall be done by means of one handle, one may interconnect the lever 23 and 30 by means of suitable mechanical mechanism.

A diagrammatical embodiment for this part of the invention is also illustrated in the drawings. This embodiment comprises the bar 39 which has a handle 40. The bar passes through the arm 41 which is fastened to the link 36 which again connects the levers 30 and 35 with each other and further through the arm 42 which is linked to the lever 23.

The bar has shoulders 43 and 44 respectively intended to come into engagement with the arms 41 and 42. It is further arranged a helical spring 45 which serves to maintain the arm 42 in engagement with the shoulder 44, and a spring 46 which serves to bias the ram 41 as far as possible in counterclock-wise direction.

If one now assumes that hoisting is taking place with the different valves in the position shown in the drawings and one desires to stop this hoisting and start lowering, then one will pull the handle 40 towards the right on the drawings. The lever 23 will then under the action of the spring 45 be swung in the clock-wise direction to the position b, whereby the hoisting will stop. At this position, the shoulder 43 will have come in contact with the arm 41, and if the handle 40 is further moved towards the right, the levers 30 and 35 will be swung in clock-wise direction, and the fluid driving power with controlled variable pressure will be sent through the pipe 37 to the cylinder 15. When the levers 30 and 35 have completed their turning until the position c, the load is lowered with the brakes entirely lifted.

If one now lets the handle 40 go, the levers 30 and 35 will be moved back to the initial position under the action of the spring 41, which is arranged between the levers 23 and 30 in such a way that the hoist will come to stop with the lever 23 in position b and the lever 30 in position b'. If one now desires to commerce hoisting, the handle 40 is moved in the direction towards the left on the drawings, whereby the lever 23 is moved over to the position a.

In the foregoing description one has assumed that two different fluid actuated driving mechanisms should be used for operating the brake band respectively for hoisting and for lowering. This is in practical embodiments of the invention not at all necessary, but is suitable for illustrating the invention.

One may, however, arrange a three-way valve 48 as shown in Figure 4 at the junction of conduits 20 and 21 and arrange another three-way valve 49 at the junction of conduits 51 and 20. A pipe connection 50 may then be established between the three-way valve 49 and the conduit 37 as shown in Figure 4 so that the connection between the pipe 21 and the cylinder 14 may be closed, while a connection between pipe 51 and the pipe 37 may be opened when a lowering of the load is to take place.

The piston 15 may then be omitted and the piston 14 will be operated as well through the valve 18 for hoisting as through the valves 27 and 32 for lowering.

I claim:

1. In a winch having a power driven hoisting drum, a clutch located between said drum and the power means and a fluid clutch actuator, the combination comprising a braking mechanism on said drum, a fluid operated release actuator for said braking mechanism, a spring operated brake applying actuator for said braking mechanism and means controlling said clutch actuator, said release actuator comprising a conduit from a source of operating fluid, a three-way valve connected to said conduit, a second conduit connected to said valve and leading to said clutch actuator and said release actuator, a third conduit connected to said three-way valve so that said clutch actuator and said release actuator may be connected respectively by said three-way valve to either said source of operating fluid or to the atmosphere, a fourth conduit connected to a source of operating fluid, two mechanically interconnecting oppositely acting valves arranged in said conduit, a fifth conduit leading from said valves to the atmosphere, a sixth conduit connected to said fourth conduit intermediate said two oppositely acting valves leading to said brake release actuator so that brake release actuator is controlled proportionately to the position of the two valves at any time.

2. In a winch having a power driven hoisting drum, a clutch located between said drum and the power means and a fluid clutch actuator, the combination comprising a braking mechanism on said drum, a fluid operated release actuator for said braking mechanism, a spring operated brake applying actuator for said braking mechanism and means controlling said clutch actuator, said release actuator comprising a conduit from a source of operating fluid, a three-way valve connected to said conduit, a second conduit connected to said valve and leading to said clutch actuator and said release actuator, a third conduit connected to said three-way valve so that said clutch actuator and said release actuator may be connected respectively by said three-way valve to either said source of operating fluid or to the atmosphere, a fourth conduit connected to a source of operating fluid, two mechanically interconnecting oppositely acting valves arranged in said conduit, a fifth conduit leading from said valves to the atmosphere, a sixth conduit connected to said fourth conduit intermediate said two oppositely acting valves leading to said brake release actuator so that said brake release actuator is controlled proportionately to the position of the two valves at any time, said three-way valve and said two interconnected valves having levers which are interconnected mechanically in such a way that the operation of said brake applying actuator takes place after said release actuator and said clutch actuator have been rendered inoperative by said three-way valve.

3. In a winch having a power driven hoisting drum, a clutch located between said drum and the power means and a fluid clutch actuator, the combination comprising a braking mechanism on said drum, a fluid operated release actuator for said braking mechanism, a spring operated brake applying actuator for said braking mechanism and means controlling said clutch actuator, said release actuator comprising a conduit from a source of operating fluid, a three-way valve connected to said conduit, a second conduit connected to said valve and leading to said clutch actuator and said release actuator, a third conduit connected to said three-way valve so that said clutch actuator and said release actuator may be connected respectively by said three-way valve to either said source of operating fluid or to the atmosphere and other means connected to a source of operating fluid for operating said brake release actuator independently of said three-way valve.

4. In a winch having a power driven hoisting drum, a clutch located between said drum and the power means and a fluid clutch actuator, the combination comprising a braking mechanism on said drum, a fluid operated release actuator for said braking mechanism, a spring operated brake applying actuator for said braking mechanism and means controlling said clutch actuator, said release actuator comprising a conduit from a source of operating fluid, a three-way valve connected to said conduit, a second conduit connected to said valve and leading to said clutch actuator and said release actuator, a third conduit connected to said three-way valve so that said clutch actuator and said release actuator may be connected respectively by said three-way valve to either said source of operating fluid or to the atmosphere, other means connected to a source of operating fluid for operating said brake release actuator and means for regulating the pressure applied to said brake release actuator.

5. In a winch having a power driven hoisting drum, a clutch located between said drum and the power means and a fluid clutch actuator, the combination comprising a braking mechanism on said drum, a fluid operated release actuator for said braking mechanism, a spring operated brake applying actuator for said braking mechanism and means controlling said clutch actuator, said release actuator comprising a conduit from a source of operating fluid, a three-way valve connected to said conduit, a second conduit connected to said valve and leading to said clutch actuator and said release actuator, a third conduit connected to said three-way valve so that said clutch actuator and said release actuator may be connected respectively by said three-way valve to either said source of operating fluid or to the atmosphere, means connected to a source of operating fluid for operating said brake release actuator and means for regulating the pressure applied to said brake release actuator including two mechanically interconnected oppositely acting valves.

JOHAN FREDRIK SELMER.